United States Patent
Matsuoka

(10) Patent No.: US 7,240,226 B2
(45) Date of Patent: Jul. 3, 2007

(54) ELECTRONIC APPARATUS, POWER CONTROLLING APPARATUS AND POWER CONTROLLING METHOD

(75) Inventor: Heiwa Matsuoka, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 378 days.

(21) Appl. No.: 10/817,948

(22) Filed: Apr. 6, 2004

(65) Prior Publication Data

US 2004/0243863 A1     Dec. 2, 2004

(30) Foreign Application Priority Data

May 26, 2003    (JP)    ............... 2003-147921

(51) Int. Cl.
*G06F 1/00*    (2006.01)
*G06F 1/32*    (2006.01)

(52) U.S. Cl. ..................... 713/300; 713/320

(58) Field of Classification Search ............ None
See application file for complete search history.

(56) References Cited

U.S. PATENT DOCUMENTS 6,058,034 A * 5/2000 Cummings et al. ........ 363/74
6,498,957 B1 * 12/2002 Umetsu .................... 700/22
6,889,331 B2 * 5/2005 Soerensen et al. ........ 713/320
2002/0099962 A1  7/2002 Nakamura

FOREIGN PATENT DOCUMENTS

JP    2002-222031    8/2001

* cited by examiner

*Primary Examiner*—Rehana Perveen
*Assistant Examiner*—Stefan Stoynov
(74) *Attorney, Agent, or Firm*—Pillsbury Winthrop Shaw Pittman, LLP

(57) ABSTRACT

When a power switch is pushed, a CPU starts a BIOS stored in a BIOS-ROM to initialize a system. In this initialization of the system, a system configuration determining portion acquires various device information, determines a system configuration, and judges the kind of an AC adapter by estimation. Further, an AC adapter setting portion updates a register of a PSC in order that a maximum rated current control corresponding to the AC adapter be performed. The PSC performs a maximum rated current control corresponding to the AC adapter and indicated by the value of the register. Then, when initialization of the system is ended, the CPU loads an OS stored in an HDD into a system memory, and starts the OS.

9 Claims, 4 Drawing Sheets

| OPERATING FREQUENCY OF CPU | 2.40/2.53/2.80GHz | 3.06GHz |
|---|---|---|
| CAPACITY OF AC ADAPTER | 90W (15V×6A) | 120W (15V×8A) |
| VALUE OF REGISTER | 0 | 1 |

| KIND OF CPU | CPU(A) | CPU(B) | | | | CPU(C) | | | |
|---|---|---|---|---|---|---|---|---|---|
| PRESENCE / ABSENCE OF DEVICE (X) | — | PRESENT | | ABSENT | | PRESENT | | ABSENT | |
| PRESENCE / ABSENCE OF DEVICE (Y) | — | PRESENT | ABSENT | — | | PRESENT | ABSENT | — | |
| KIND OF AC ADAPTER | AC ADAPTER (A) | AC ADAPTER (B) | | | | AC ADAPTER (C) | | | |

ELECTRONIC APPARATUS, POWER CONTROLLING APPARATUS AND POWER CONTROLLING METHOD

CROSS-REFERENCE TO RELATED APPLICATIONS

This application is based upon and claims the benefit of priority from prior Japanese Patent Application No. 2003-147921, filed May 26, 2003, the entire contents of which are incorporated herein by reference.

BACKGROUND OF THE INVENTION

1. Field of the Invention

The present invention relates to a technique for performing current control in accordance with the maximum rated current of an kind of AC adapter applied to, e. g., a personal computer.

2. Description of the Related Art

In recent years, various types of personal computers such as desktop personal computers and notebook personal computers have been manufactured and sold. In general, a series of models having different CPUs or different optional devices are prepared with respect to each type of personal computer. Furthermore, recently, a so-called BIO (built-in order) service has been gradually diffused. In this service, the system of a computer is configured in accordance with a customer's request.

Moreover, such a type of personal computer as stated above is made to allow an AC adapter for AC power supply to be connected to the personal computer. Usually, when the personal computer is used indoors, one end of the AC adapter is connected to the personal computer, and the other end is connected to a wall outlet. Each of the AC adapters is defined the maximum rated currents. Thus, the power consumption of the personal computer is controlled by a power controlling device in accordance with the maximum rated current of an AC adapter (see, e.g., Jpn. Pat. Appln. KOKAI Publication No. 2002-222031).

As is often the case, all of a series of models of personal computers incorporate the same type of power controlling devices as their parts. Thus, until now, the same kind of AC adapters have been packed along with all of the series of personal computers. As the kind of AC adapter, an AC adapter adapted for one of the models of personal computers, which incorporates a CPU having the highest performance and thus has the largest power consumption, has been adopted. Also, each of the power controlling devices has been set to perform current control in accordance with the maximum rated current of the above adopted AC adapter.

However, when an AC adapter adapted to a model of personal computer incorporating a CPU having a high performance is packed along with a model of personal computer incorporating a CPU having a low performance, the total cost of the AC adapter and the personal computer is inevitably high. This is disadvantageous for both the manufacturer/distributor and the customer. On the other hand, it is not realistic that in order that suitable AC adapters be respectively applied to a number of models of personal computers with respect to the maximum rated current, different power controlling devices designed to perform respective current controls in accordance with the maximum rated currents of the AC adapters are provided in the models of personal computers, respectively. This will also increase the above total cost. It is therefore preferable that the same type of power controlling devices applicable to a number of kinds of AC adapters be provided in the series of personal computers, and be made to perform current controls in accordance with the maximum rated currents of the AC adapters applied to the personal computers, respectively.

And now, in the case where the same type of power controlling devices applicable to a number of kinds of AC adapters are adopted in respective personal computers, it is necessary to recognize the kind of an AC adapter packed along with a personal computer. As a method of recognizing the kind of the AC adapter, for example, there can be a method using a specific switch, or a method of providing an identification signal line to a connector for an AC adapter, and detect the state of the identification signal line, with a voltage applied, at the time of connecting the AC adapter to the personal computer. However, provision of such a mechanism for recognizing the kind of an AC adapter will also cause the cost to be increased, and also the space required for the computer and the mechanism to be increased.

BRIEF SUMMARY OF THE INVENTION

According to an embodiment of the present invention, an electronic apparatus comprises a connector configured to connect an AC adapter to the electronic apparatus, a power supply controlling unit configured to control supplying of power from the AC adapter to a system of the electronic apparatus, to thereby prevent an amount of current from the AC adapter, which is supplied through the connector, from exceeding a maximum rated current amount of the AC adapter, a system configuration determining unit configured to determine a configuration of the system, and an AC adapter setting unit configured to determine a kind of the AC adapter connected to the connector based on a result of determination by the system configuration determining unit, and cause the power supply controlling unit to perform current control in accordance with a maximum rated current of the determined AC adapter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be explained with reference to the accompanying drawings.

Figures 1, 3:
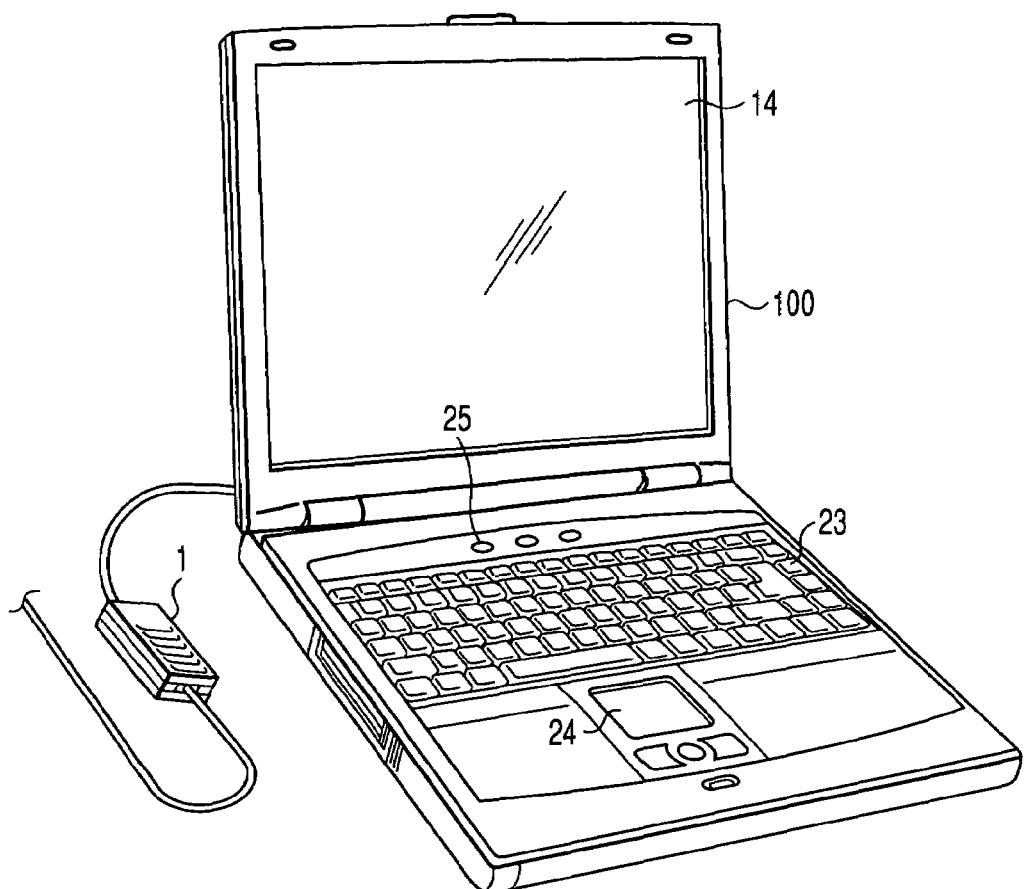
FIG. 1 is a view showing an appearance of an electronic apparatus according to an embodiment of the present invention.
FIG. 3 is a view showing a relationship between the operating frequency of a CPU, the capacity of an AC adapter and the value of a register 261 in the electronic apparatus according to the embodiment of the present invention.

FIG. 1 is a view showing an appearance of an electronic apparatus according to an embodiment of the present invention.

As shown in FIG. 1, an electronic apparatus 100 is a so-called notebook personal computer (PC). A Liquid Crystal Display (LCD) 14 for displaying an image is provided on an inner surface of a cover portion openably joined to a main body by a hinge mechanism. A keyboard 23 for inputting data and a touch PAD 24 are provided on an upper surface of the main body, which faces the LCD 14 when the cover portion is closed. Also, on the upper side of the main body, a power switch 25 for giving an instruction for starting the system of the electronic apparatus 100 is provided. On a rear side of the main body, a connector is provided which allows a code of an Alternating Current (AC) adapter 1 to be connected to the main body as occasion arises. For example, at an office or home, the electronic apparatus 100 is operated by AC power supply.

Figure 2:
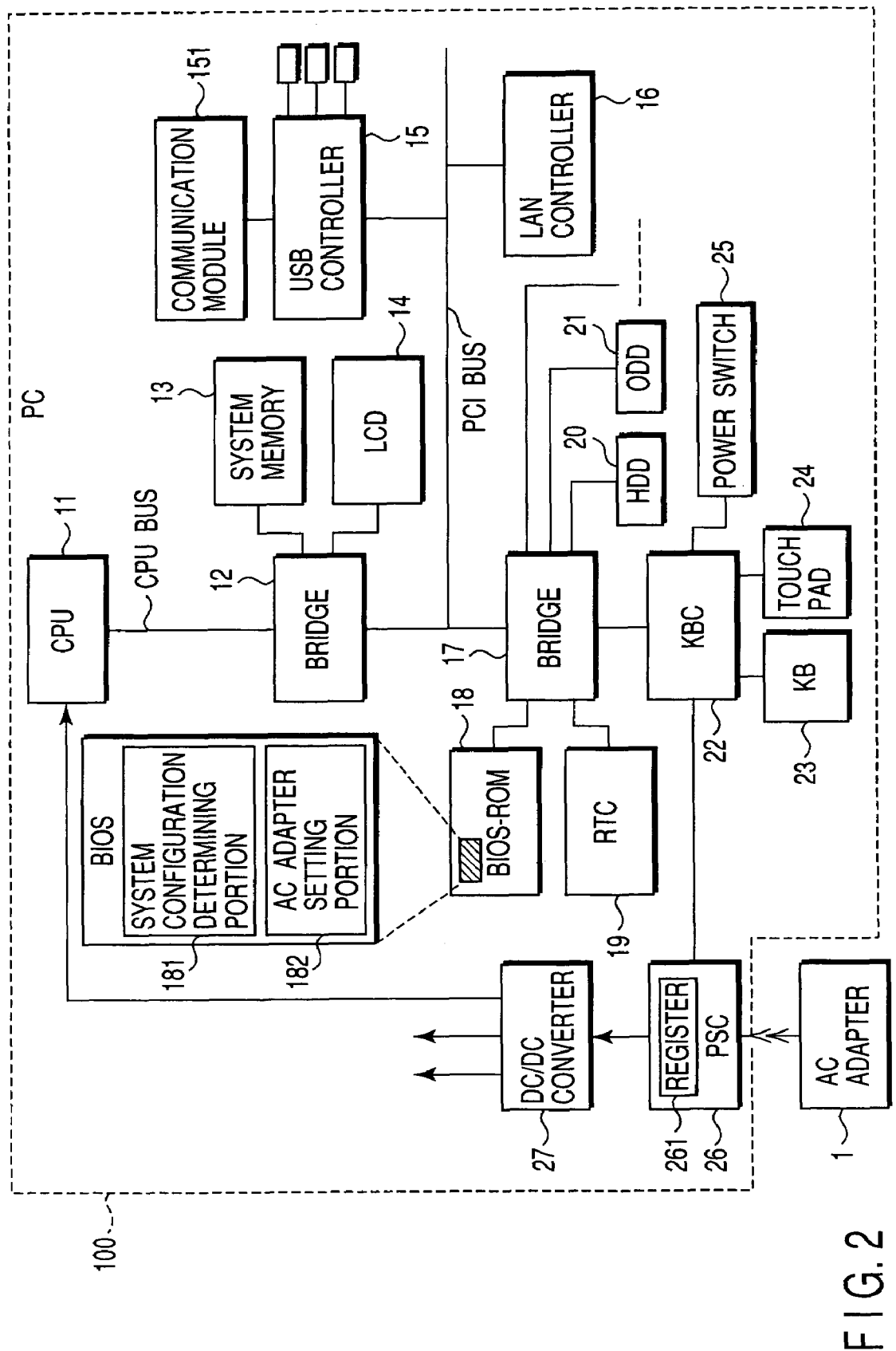
FIG. 2 is a view showing the system configuration of the electronic apparatus according to the embodiment of the present invention.

FIG. 2 shows the system configuration of the electronic apparatus 100.

As shown in FIG. 2, the electronic apparatus 100 comprises a CPU 11, a bridge 12, a system memory 13, a universal serial bus (USB) controller 15, a local area network (LAN) controller 16, a bridge 17, a basic input/output system (BIOS)-ROM 18, a real time clock (RTC) 19, a hard disk drive (HDD) 20, an optical disk drive (OCD) 21, a keyboard controller (KBC) 22, a power supply controller (PSC) 26, and a DC-to-DC converter 27, in addition the LCD 14, the keyboard (KB) 23, the touch PAD 24 and the power switch 25, all shown in FIG. 1.

The CPU 11 controls the entire system of the electronic apparatus 100, and executes an operating system or application program stored in the system memory 13 and a BIOS stored in the BIOS-ROM 18, etc. The operating frequency of the CPU 11 varies from one kind of CPU 11 to another. In this case, suppose the electronic apparatus 100 includes any of four CPUs whose operating frequencies are 2.40 GHz, 2.53 GHz, 2.80 GHz and 3.06 GHz, respectively. It should be noted that the CPU 11 is characterized in that its processing speed is high, but its power consumption is large. Also, suppose when manufactured electronic apparatus 100 are packed, not all AC adapters to be packed along with the electronic apparatus 100 are limited to the same kind of AC adapter which is adapted to the power consumption of a CPU 11 having an operating frequency of 3.06 GHz. To be more specific, suppose when electronic apparatus 100 including CPUs 11 each having an operating frequency of 3.06 GHz are packed, AC adapters 1 each adapted for 120 W are packed along with the electronic apparatus 100, and when electronic apparatus 100 including CPUs 11 each having any of the other three frequencies are packed, AC adapters 1 each adapted for 90 W are packed.

The bridge 12 has a function of connecting a CPU bus and a PCI bus, which is its inherent function, and in addition, a function of controlling an access to the system memory 13 and a function of controlling displaying of the LCD 14, which correspond to the functions of controlling devices called a memory controller and a graphic controller, respectively. The system memory 13 is a storage medium which is a main storage of the system, and temporarily stores a program to be executed by the CPU 11 and the data of the program.

To the PCI bus connected to the CPU bus by the bridge 12, the USB controller 15, the LAN controller 16 and the bridge 17 are connected. The USB controller 15 achieves a serial interface between the electronic apparatus 100 and another electronic apparatus, which are connected by a cable. Furthermore, the USB controller 15 includes a radio communication module 151 for performing radio communication. The LAN controller 16 performs communication through a network such as Internet (R).

The bridge 17 has a function of connecting the PCI bus and various I/O devices as its main function. To the bridge 17, the BOOS-ROM 18, the RTC 19, the HDD 20, the ODD 21 and the KBC 22 are connected. The BIOS-ROM 18 stores a BIOS for controlling driving of hardware provided in the system by using software. The BIOS stored in the BIOS-ROM 18 includes a system configuration determining portion 181 and an AC adapter setting portion 182, which will be described later. The RTC 19 is a clock module including its specific battery, and manages the time set in the system. Also, in the RTC 19, a register for storing configuration setting information of the system is provided as an internal register.

The HDD 20 and the ODD 21 are storage medium which are external storages of the system, and store programs or data as auxiliary devices of the system memory 13. When the KB 23, the touch PAD 24 or the power switch 25 is operated by the user, the KBC 22 stores, in the internal register, data indicating the operation by the user, and transmits it to the CPU 11 by generating an interrupt signal.

Furthermore, the PSC 26 is connected to the KBC 22, and the KBC 22 has a function of relaying data between the PSC 26 and the CPU 11. The PSC 26 collectively manages a control of supplying of power to each of internal portions of the system, and also serves as an AC-to-DC converter. Power converted into a direct current by the PSC 26 is transmitted to the DC-to-DC converter 27, and is then converted into a voltage which is required for each inner portion of the system. The PSC 26 monitors the amount of current from the AC adapter 1 such that it does not exceed the maximum rated current amount, and performs some operation for reducing the power consumption, e.g., lowering the clock rate of the CPU 11.

It should be noted that as described above, four kinds of CPUs 11 having operating frequencies of 2.40 GHz, 2.53 GHz, 2.80 GHz and 3.06 GHz are prepared, and the capacity of the AC adapter 1 to be packed along with the electronic apparatus 100 varies in accordance with which of the four kinds of CPUs 11 is provided in the electronic apparatus 100. That is, a threshold value for determining whether or not the amount of current from the AC adapter 1 exceeds the maximum rated current amount varies. Then, firstly, in the electronic apparatus 100, a register 261 for discriminating AC adapters 1 from each other is provided in the PSC 26, and the PSC 26 performs current control with respect to the maximum rated current amount of one of the AC adapters 1, which is discriminated from the others by the value of the register 261. Secondly, the BIOS, which is software, determines the operating frequency of the CPU 11 to judge by estimation the kind of the AC adapter 1 applied to the electronic apparatus 100, and sets the register 261 based on the result of the estimation. Accordingly, the register 261 can be set without the need to provide a physical mechanism for discriminating AC adapters from each other, such as a switch.

FIG. 3 is a view showing a relationship between the operating frequency of the CPU 11 in the electronic apparatus 100, the value of the register 261 and the capacity of the AC adapter.

When the power switch 25 is pushed, information indicating that it is pushed is transmitted from the KBC 22 to the CPU 11, and the CPU 11 then executes the BIOS stored in the BIOS-ROM 18, and starts to initialize the system. In this initialization of the system, the system configuration determining portion 181 of the BIOS determines the operating frequency of the CPU 11, and informs the AC adapter setting portion 182 of the operating frequency.

When the determined frequency is "3.06 GHz", the AC adapter setting portion 182 of the BIOS sets the value of the register 261 of the PSC 26 to "1", and when it is a value other than "3.06 GHz", i.e., one of the remaining three values (2.40 GHz, 2.53 GHz, 2.80 GHz), the AC adapter setting portion 182 sets the value of the register 261 to "0". Then, when initialization of the system is ended, the CPU 11 loads an OS stored in the HDD 20 into the system memory 13, and starts the OS.

When the value of the register 271 is set to "1", in order to achieve current control in accordance with the maximum rated current of an AC adapter adapted for 120 W (i.e., a maximum rated current control corresponding to the AC adapted for 120 W), the PSC 26 monitors the amount of current from the AC adapter 1 such that it does not exceed does not 8A. When the value of the register 271 is set to "0", in order to achieve current control in accordance with the maximum rated current of an AC adapter adapted for 90 W (i.e., a maximum rated current control corresponding to the AC adapter adapted for 90 W), the PSC 26 monitors the amount of current from the AC adapter 1 such that it does not exceed 6A.

In such a manner, the PSC 26 performs a maximum rated current control corresponding to the kind of the AC adapter 1 based on the value of the register 261. Thus, the electronic apparatus 100 does not need to change the PSC 26, even when the AC adapter 1 to be packed along with the electronic apparatus 100 is changed in accordance with the operating frequency of the CPU 11. That is, the PSC 26 is applicable to all the kinds of the AC adapters 1.

Furthermore, the BIOS (software) determines the operating frequency of the CPU 11 to judge by estimation the kind of the AC adapter 1 applied to the electronic apparatus 100, and sets the register 261 based on the result of the estimation. Accordingly, it is not necessary to provide a physical mechanism for discriminating AC adapters from each other, e.g., a switch.

The above explanation refers to a case where the kind of an AC adapter 1 to be packed along with the electronic apparatus 100 is judged by estimation based on the operating frequency of the. CPU 11. However, the BIOS can acquire various device information, in addition to the operating frequency of the CPU 11. Thus, the reference for use in judging the kind of an AC adapter 1 to be packed is not limited to the operating frequency of the CPU 11. For example, in the case where a series of models of electronic apparatus are prepared, needless to say, there is a possibility that there may be a unit (device) which is provided in the highest-level model, but not provided in the lower-level model, and the highest-level model may include a unit (device) differing in kind from that included in the lowest-level model. In the BIO service, the above possibility is strong. To be more specific, it can be sufficiently considered that a model of electronic apparatus includes an ODD 21, whereas another model of electronic apparatus does not include it, or a model of electronic apparatus includes an n-times speed ODD 21, and another model of electronic apparatus includes an (n×4)-times ODD 21. Such a unit (device) will hereinafter be referred to as an optional device. If the kind of the optional device or the presence/absence thereof has a great influence over the power consumption of the entire system of the electronic apparatus 100, i.e., if the AC adapter 1 to be packed along with the electronic apparatus 100 varies in accordance with the kind of the optional device or the presence/absence thereof, the BIOS may be set to determine the kind of the optional device or the presence/absence thereof, and judge by estimation the kind of the AC adapter based on the result of the above determination.

The reference for judging by estimation the kind of an AC adapter 1 does not need to be limited to a reference for identifying the CPU 11 or a reference for determining the presence or absence of an optional device. That is, the kind of the AC adapter 1 may be judged by estimation based on a combination of a number of references. For example, as shown in FIG. 4, it may be judged by estimation based on three references, i.e., the kind of the CPU 11, the presence/absence of a device (A), and the presence/absence of a device (B).

Figures 4, 6:
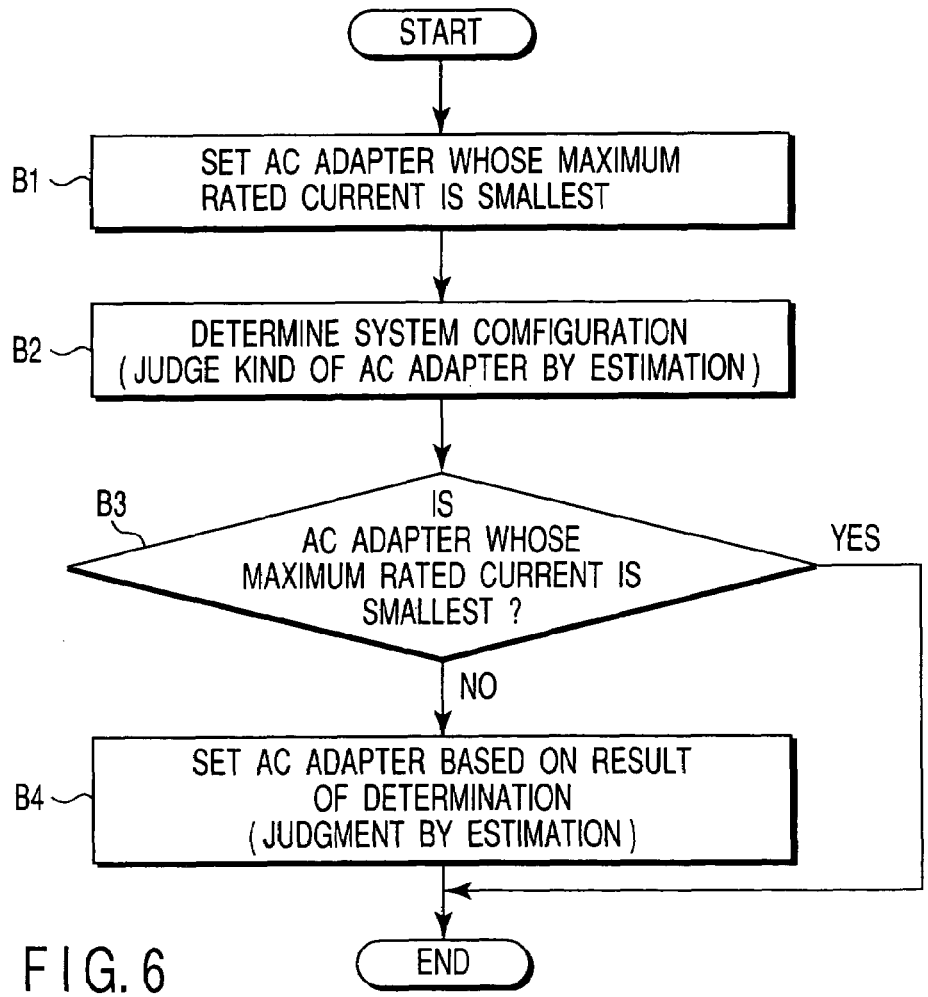
FIG. 4 is a view for explaining examples of combinations of references for use in judging by estimation the kind of the AC adapter used along with the electronic apparatus according to the embodiment of the present invention.
FIG. 6 is a flowchart for showing a modification of the procedure for setting environment for the maximum rated current control corresponding to the AC adapter, which is performed by the electronic apparatus according to the embodiment of the present invention.

In the example shown in FIG. 4, when a CPU (A) is identified as the CPU of the electronic apparatus 100, it is judged by estimation that an AC adapter (A) is packed along with the electronic apparatus 100. When a CPU (B) is identified as the CPU of the electronic apparatus 100, only in the case where it is determined that both a device (A) and a device (b) are provided in the electronic apparatus 100, it is judged by estimation that the AC adapter (A) is packed along with the electronic apparatus 100, and in other cases, it is judged by estimation that an AC adapter (B) is packed along with the electronic apparatus 100. When a CPU (C) is identified as the CPU of the electronic apparatus 100, only in the case where it is determined that both the devices (A) and (b) are provided in the electronic apparatus 100, it is judged by estimation that the AC adapter (B) is packed along with the electronic apparatus 100, and in other cases, it is judged by estimation that an AC adapter (C) is packed along with the electronic apparatus 100.

In such a manner, various principles can be applied as principles for determining of the system configuration by the system configuration determining portion 181 of the BIOS and for judging by estimation of the AC adapter setting portion 182 based on the system configuration.

Figure 5:
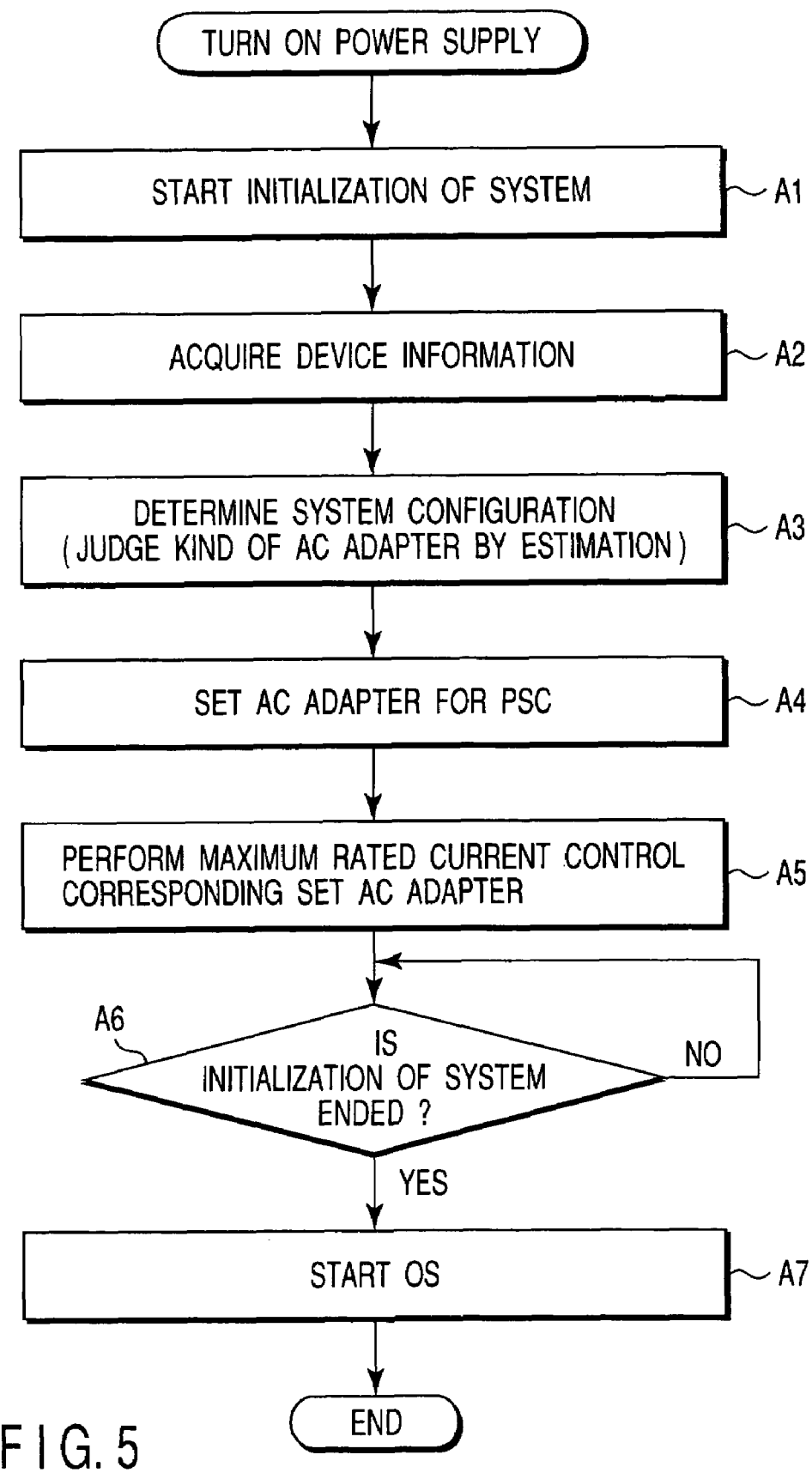
FIG. 5 is a flowchart for showing a procedure for setting environment for a maximum rated current control corresponding to the AC adapter, which is performed by the electronic apparatus according to the embodiment of the present invention.

FIG. 5 is a flowchart showing a procedure for setting a configuration required for a maximum rated current control corresponding to the AC adapter 1, which is carried by the electronic apparatus 100.

When the power switch 25 is pressed, the CPU 11 starts to initialize the system with the BIOS (Step A1). In this initialization of the system, the system configuration determining portion 181 of the BIOS acquires device information for use in determining a system configuration necessary for judging by estimation the kind of the AC adapter 1 (Step A2). Then, the system configuration determining portion 181 determines the system configuration based on the acquired device information, and judges by estimation the kind of the AC adapter 1 (Step A3).

When the kind of the AC adapter 1 is judged by estimation by the system configuration determining portion 181, the AC adapter setting portion 182 of the BIOS executes an access to the register 261 of the PSC 26, in order to perform a maximum rated current control corresponding to the AC adapter 1 (Step A4). The PSC 26 performs a maximum rated current control corresponding to the AC adapter 1 the kind of which is indicated by the value of the register 261 (Step A5).

Then, when processing for initializing the system by the BIOS, which includes setting of the register 261, is ended (Yes in Step A6), the CPU 11 loads the OS stored in the HDD 20 into the system memory 13, and starts the OS (Step A7).

Strictly speaking, it is not guaranteed that the value of the register 261 is appropriate, until the kind of the AC adapter 1 is judged by estimation by the system configuration determining portion 181, and the register 261 is set by the AC adapter setting portion 182, after the power switch is pressed. This appears to hardly influence the system, since the above estimation and the setting of the register 261 are completed before the OS starts. However, to make doubly sure, the register 261 may be set in the procedure shown in, e.g., FIG. 6.

To be more specific, the AC adapter setting portion 182 temporarily sets the register 261 before the kind of the AC adapter is judged by estimation by the system configuration determining portion 181, in order that current control be carried out in accordance with the maximum rated current of an AC adapter, which is the smallest of those in a number of AC adapters (Step B1). Then, when the kind of the AC adapter is judged by estimation by the system configuration determining portion 181 (Step B2), it is determined based on the result of the estimation whether or not the maximum rated current amount of the AC adapter is the smallest (Step B3). Then, if it is determined that the maximum rated current is not the smallest (No in Step B3), the register 261 is re-set based on the above result of the estimation (Step B4).

Thereby, in a high-level model of electronic apparatus 100 packed along with an AC adapter 1 adapted for 120 W, just after the power switch 25 is pressed, a maximum rated current control corresponding to an AC adapter 1 adapted for 90 W is carried out by the PSC 26. On the other hand, in a lower-level model of electronic apparatus 100 packed along with an AC adapter 1 adapted for 90 W, just after the power switch 25 is pressed, a maximum rated current control corresponding to an AC adapter 1 adapted for 120 W is reliably prevented from being carried out.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a connector configured to connect an AC adapter to the electronic apparatus;
   a power supply controlling unit configured to control supplying of power from the AC adapter to a system of the electronic apparatus, to thereby prevent an amount of current from the AC adapter, which is supplied through the connector, from exceeding a maximum rated current amount of the AC adapter;
   a system configuration determining unit configured to determine a configuration of the system with the system configuration determining unit and the AC adapter setting unit are operated at time of starting the system; and
   an AC adapter setting unit configured to temporarily select a temporary AC adapter whose maximum rated current amount is the smallest, and cause the power supply controlling unit to perform current control in accordance with a maximum rated current of the selected AC adapter, and then to judge by estimation a kind of the AC adapter connected to the electronic apparatus by the connector based on a result of determination by the system configuration determining unit, and cause the power supply controlling unit to perform current control in accordance with a maximum rated current of the judged AC adapter.

2. The electronic apparatus according to claim 1, wherein the system configuration determining unit determines an operating frequency of a processor provided in the electronic apparatus.

3. The electronic apparatus according to claim 1, wherein the system configuration determining unit determines a kind of an optional device provided in the electronic apparatus.

4. The electronic apparatus according to claim 1, wherein the system configuration determining unit determines whether or not an optical device is provided in the electronic apparatus.

5. The electronic apparatus according to claim 1, wherein the system configuration determining unit and the AC adapter setting unit are provided as functions of a Basic Input/Output System, which are to be executed by a processor provided in the electronic apparatus.

6. A power supply controlling method applied to an electronic apparatus including a power supply controlling unit which controls supplying of power from an AC adapter connected to the electronic apparatus by a connector to a system, to thereby prevent an amount of current from the AC adapter from exceeding a maximum rated current amount of the AC adapter, comprising:
   determining a configuration of the system with the determining a system configuration and the determining an AC adapter are carried out at time of starting the system; and
   temporarily selecting an AC adapter whose maximum rated current amount is the smallest, and causing the power supply controlling unit to perform current control in accordance with a maximum rated current of the selected AC adapter, and then judging by estimation a kind of the AC adapter connected to the connector based on determined system configuration, and causing the power supply controlling unit to perform current control in accordance with a maximum rated current of the judged AC adapter.

7. The power supply controlling method according to claim 6, wherein the determining a system configuration determines an operating frequency of a processor provided in the electronic apparatus.

8. The power supply controlling method according to claim 6, wherein the determining a system configuration determines a kind of an optional device provided in the electronic apparatus.

9. The power supply controlling method according to claim 6, wherein the determining a system configuration determines whether or not an optional device is provided in the electronic apparatus.

* * * * *